(12) United States Patent
Pass

(10) Patent No.: US 11,807,367 B2
(45) Date of Patent: Nov. 7, 2023

(54) MULTIPLE HOIST DELIVERY SYSTEM FOR DELIVERING PARCELS USING UNMANNED AERIAL VEHICLES

(71) Applicant: United Parcel Service of America, Inc., Atlanta, GA (US)

(72) Inventor: John Pass, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 151 days.

(21) Appl. No.: 17/108,613

(22) Filed: Dec. 1, 2020

(65) Prior Publication Data
US 2021/0253251 A1    Aug. 19, 2021

Related U.S. Application Data

(60) Provisional application No. 62/942,493, filed on Dec. 2, 2019.

(51) Int. Cl.
*B64D 1/22* (2006.01)
*B64C 39/02* (2023.01)
(Continued)

(52) U.S. Cl.
CPC ............ *B64D 1/22* (2013.01); *B64C 39/024* (2013.01); *B64D 1/12* (2013.01); *B64U 2101/60* (2023.01); *B64U 2201/10* (2023.01)

(58) Field of Classification Search
CPC ............ B64D 1/12; B64D 1/22; B64D 1/02
See application file for complete search history.

(56) References Cited

U.S. PATENT DOCUMENTS 3,661,415 A * 5/1972 Piasecki ............... B66C 1/10
                                                    294/81.1
3,934,847 A * 1/1976 Bentivegna ........... B64D 1/22
                                                     441/83
(Continued)

FOREIGN PATENT DOCUMENTS

CN         107985598 A      5/2018
EP           2481671 A2     8/2012
(Continued)

OTHER PUBLICATIONS

International Search Report and Written Opinion received for PCT Patent Application No. PCT/US2020/062849, dated Mar. 9, 2021, 12 pages.

*Primary Examiner* — Joshua J Michener
*Assistant Examiner* — Arfan Y. Sinaki
(74) *Attorney, Agent, or Firm* — SHOOK, HARDY & BACON L.L.P.

(57) ABSTRACT

A multiple hoist system is used with an unmanned aerial vehicle (UAV) for delivering parcels. An example of the multiple hoist system comprises two or more hoists that are independently operable, meaning that a first hoist can lower or raise a first line independently of using a second hoist to raise or lower a second line. The hoists can independently raise and lower their associated lines to allow the UAV to deliver multiple parcels to multiple delivery locations, or the hoists can synchronously raise and lower the associated lines together so that larger parcels can be delivered using the UAV. The hoists can be comprised within a body of the multiple hoist system. The body can further include a securing device for releasably securing the multiple hoist system to the UAV.

20 Claims, 9 Drawing Sheets

(51) Int. Cl.
*B64D 1/12* (2006.01)
*B64U 101/60* (2023.01)

(56) References Cited

U.S. PATENT DOCUMENTS

| | | | | |
|---|---|---|---|---|
| 7,887,011 | B1 * | 2/2011 | Baldwin | B64D 1/22 |
| | | | | 294/68.1 |
| 10,985,539 | B1 * | 4/2021 | Thomas | B64C 39/02 |
| 11,312,598 | B2 * | 4/2022 | Whaley | B66D 3/06 |
| 2012/0193476 | A1 * | 8/2012 | Figoureux | B64D 1/22 |
| | | | | 244/137.4 |
| 2014/0363267 | A1 * | 12/2014 | Kulesha | B64D 9/00 |
| | | | | 414/812 |
| 2016/0185577 | A1 * | 6/2016 | Berry | B66D 1/52 |
| | | | | 254/281 |
| 2016/0325454 | A1 * | 11/2016 | Povroznik, III | B26D 5/086 |
| 2017/0166309 | A1 * | 6/2017 | Sekiya | B64D 11/062 |
| 2017/0197718 | A1 * | 7/2017 | Buchmueller | B64C 17/00 |
| 2017/0247109 | A1 * | 8/2017 | Buchmueller | B64C 39/024 |
| 2017/0253335 | A1 * | 9/2017 | Thompson | B64C 39/024 |
| 2018/0215593 | A1 * | 8/2018 | Friederichs | B26D 5/08 |
| 2018/0244509 | A1 * | 8/2018 | Curran | B66D 1/485 |
| 2018/0312247 | A1 * | 11/2018 | Ichihara | B64C 39/02 |
| 2019/0292025 | A1 * | 9/2019 | Capek | B66F 19/00 |
| 2020/0094962 | A1 * | 3/2020 | Sweeny | B64D 1/02 |
| 2020/0140245 | A1 * | 5/2020 | Yasuda | B66D 1/22 |

FOREIGN PATENT DOCUMENTS

| | | |
|---|---|---|
| FR | 2205470 | 5/1974 |
| WO | 2018/223031 A1 | 12/2018 |

* cited by examiner

MULTIPLE HOIST DELIVERY SYSTEM FOR DELIVERING PARCELS USING UNMANNED AERIAL VEHICLES

CROSS-REFERENCE TO RELATED APPLICATIONS

This is a non-provisional patent application claiming priority benefit to provisional U.S. Patent App. No. 62/942,493, titled "Multiple Hoist Delivery System for Delivering Parcels Using Unmanned Aerial Vehicles," filed on Dec. 2, 2019 and incorporated by reference herein in its entirety.

BACKGROUND

Delivering parcels using drones, in particular unmanned aerial vehicles (UAVs), is becoming a reality. Currently, there are some UAVs that deliver parcels by lowering the parcel downward from the UAV using a line. Lowering parcels downward from an altitude of the UAV is beneficial because it allows the UAV to remain at a safe distance above a surface, so that it can avoid interaction with objects and people. This increases the safety of UAV delivery, and it allows UAV delivery to a greater number of locations, such as locations that would be difficult for a UAV to traverse if it were to deliver a parcel close to the surface.

The drawback, however, is that current systems have only one line. This restricts these systems to delivering a single parcel or one group of parcels to a single location. Once the parcels are released from the line, the UAV must navigate back to a loading point to pick up another parcel and continue delivery.

SUMMARY

At a high level, aspects described herein relate to a UAV having a multiple hoist system. The multiple hoist system comprises at least two hoists that are independently operable. By having independently operable hoists, a first line associated with a first hoist can be lowered independently of a second line associated with a second hoist. This allows for multiple parcels to be loaded onto the UAV and delivered to multiple delivery locations. This also allows for a single, larger parcel to be secured at multiple points using both the first and second lines. The lines can be synchronously lowered or raised to deliver the larger parcel. In this way, the multiple hoist system provides for a more versatile UAV delivery system.

Another aspect of the multiple hoist system includes a body that houses the at least two hoists. The body can include a securing device, such as a securing hook, latch, threaded system, etc. that releasably engages a securing area of the UAV. In this manner, the multiple hoist system can be easily removed from and attached to a UAV.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
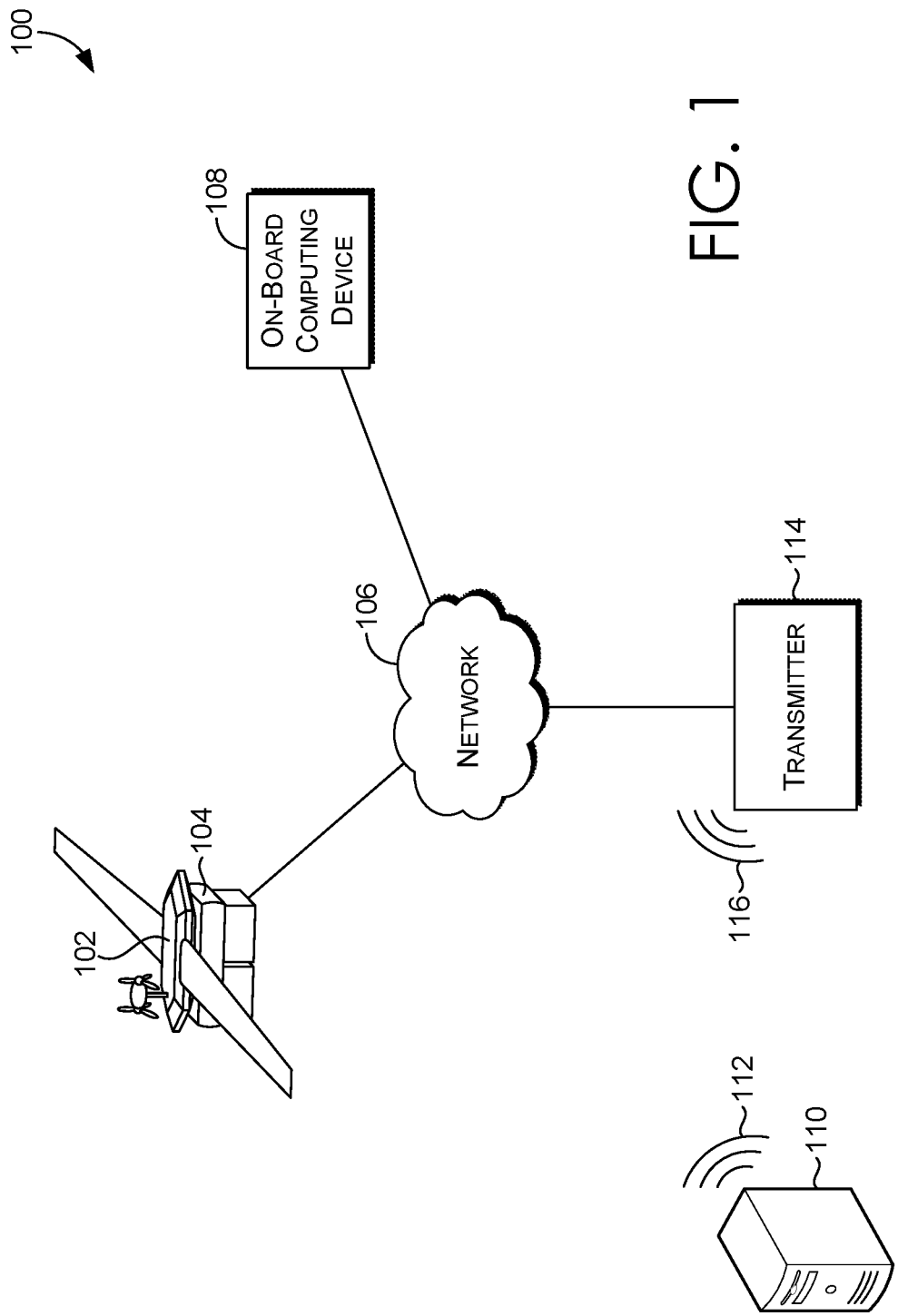
FIG. 1 is an example operating environment employing a multiple hoist system with a UAV, in accordance with an aspect described herein.

FIG. 1 depicts a block diagram of example operating environment 100 for UAV delivery using a multiple hoist delivery system. Illustrated in the example operating environment 100 is UAV 102 having an attached multiple hoist delivery system 104. UAV 102 is in communication via network 106 to on-board computing device 108. It should be understood that operating environment 100 shown in FIG. 1 is an example of one suitable operating environment, and that other arrangements, including more or less components, are also suitable.

UAV 102 can be any type of UAV. In general, a UAV includes any flight-capable vehicle that can be controlled remotely by a human pilot, operate autonomously based on a set of received or determined instructions, or a combination of both. UAVs may include vertical take-off and landing (VTOL) aircraft, which are aircraft that can hover, take off, or land vertically or near vertically. Examples of these include single-rotor VTOL aircraft, such as helicopters, or multi-rotor VTOL aircraft. UAV is also intended to include conventional take-off and landing (CTOL) aircraft. CTOL aircraft generally take off and land over a distance. Many CTOLs include fixed-wing aircraft that use an airfoil for forward flight advantages. UAV is also intended to include aircraft using a combination of rotor(s) and a fixed wing. Thus, while UAV 102 is illustrated as a fixed-wing CTOL aircraft, in practice, it may be any type of UAV, including a multi-rotor VTOL aircraft.

As illustrated, UAV 102 has attached multiple hoist system 104. Multiple hoist system 104 is configured to be releasably secured to UAV 102. Multiple hoist system 104 includes a plurality of hoists that are independently movable. In this way, one or more parcels may be lowered and raised by UAV 102 from safe altitudes. Various embodiments of multiple hoist systems that are suitable for use as multiple hoist system 104 will be described in more detail throughout this disclosure.

With continued reference to FIG. 1, UAV 102 communicates via network 106 to on-board computing device 108. Network 106 encompasses any form of wired or wireless communication. Wireless communication examples include one or more networks, such as a public network or virtual private network "VPN." Network 106 may include one or more local area networks (LANs) wide area networks (WANs), or any other communication network or method. In addition to Wi-Fi, other wireless examples include Bluetooth an infrared communication methods.

UAV 102 comprises on-board computing device 108. An example of on-board computing device 108 includes a flight controller. Various flight controllers are available for use with UAV 102. One of ordinary skill in the art will have an understanding of the availability and benefits of such flight controllers. Though represented as a single component, on-board computing device 108 can be distributed in nature. That is, one or more functions may be performed by a single component or by a plurality of components distributed throughout UAV 102. On-board computing device 108 generally includes a processor that executes instructions stored on computer memory. An example includes computing device 900 of FIG. 900.

On-board computing device 108 may receive instructions from remote server 110. To do so, on-board computing device 108 can be in communication with a receiver (not illustrated) to receive signal 112 from remote server 110. On-board computing device 108 may also communicate to remote server 110 using transmitter 114 that sends signal 116.

In general, receivers and transmitters comprise any system known in the art for sending and receiving communication signals, such as those represented by signal 112 and signal 116. Examples may include receivers and transmitters that send and receive signals across a frequency band of the electromagnetic spectrum. Some suitable short-distance transmitter-receiver pairs are configured for use with 900 MHz, 2.4 GHz, and 5.8 GHz communication bands. Some over-the-horizon (OTH) transmitter-receiver pairs utilize telecommunications bands, such as those supporting LTE, 4G, and 5G bands. Other example transmitter-receiver pairs use frequency bands associated with satellite communications. These are just examples, and other suitable communication methods may be used and are contemplated to be within the scope of this disclosure.

With reference back to FIG. 1, it should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, some functions may be carried out by a processor executing instructions stored in memory as further described with reference to FIG. 9.

Figure 2:
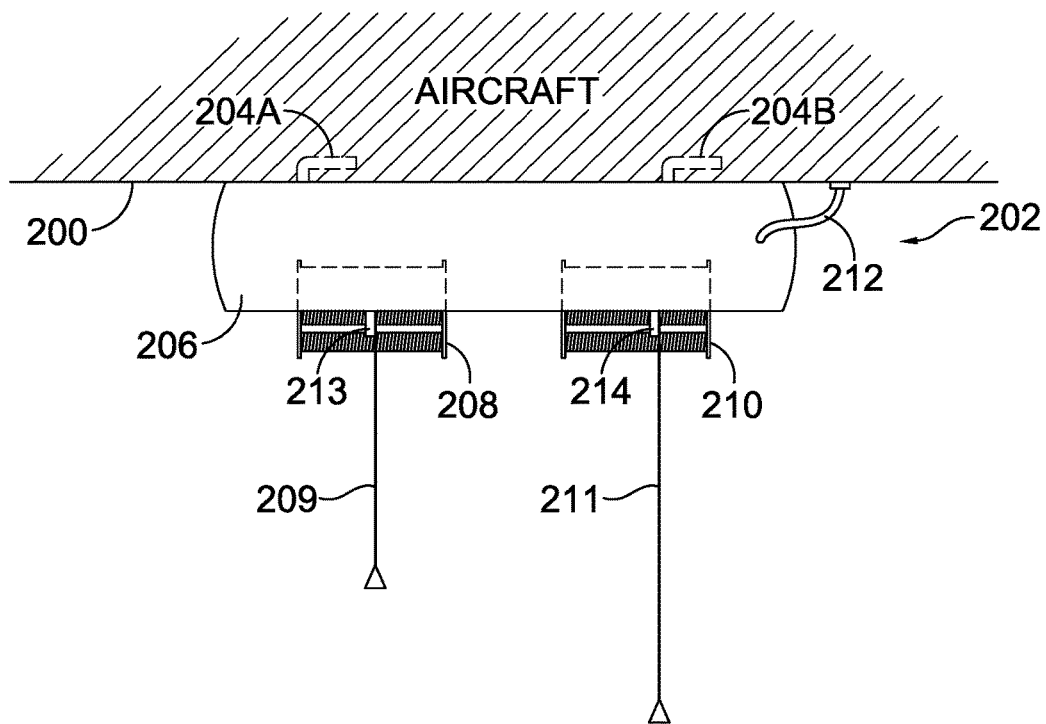
FIG. 2 is a side view of an example multiple hoist system affixed to a UAV, in accordance with an aspect described herein.

Turning now to FIG. 2, a side view of example multiple hoist system 202 is illustrated. As illustrated, multiple hoist system 202 is secured to UAV 200. Multiple hoist system 202 comprises body 206. Body 206 houses at least two hoists, including first hoist 208 having first line 209 and second hoist 210 having second line 211.

As shown, multiple hoist system 202 is secured to UAV 200 using securing hooks 204A and 204B. While there are two securing hooks illustrated in FIG. 2, any number of securing hooks, including a single securing hook may be used. Here, securing hooks 204A and 204B are illustrated as affixed to body 206 of multiple hoist system 202. Securing hooks 204A and 204B can be affixed to an upper surface of body 206. In another example, securing hooks 204A and 204B may be affixed to UAV 200.

In general, each securing hook can have a corresponding securing area for which to secure. Securing areas can include a recessed area or opening shaped to receive securing hooks, or any other area of contact suitable for releasably securing hooks, or a securing device, more generally. As illustrated, where securing hooks 204A and 204B are affixed to body 206, the corresponding securing areas are found on UAV 200. In an embodiment not illustrated, where securing hooks (or a securing device, more generally) are affixed to a UAV, the securing areas may be located on the multiple hoist system body.

Securing hooks 204A and 204B are suitable for releasably securing multiple hoist system 202 to UAV 200. To do so, securing hooks 204A and 204B can be placed within corresponding securing areas on UAV 200. Securing hooks 204A and 204B can then be moved to a securing position to releasably secure multiple hoist system 202.

It will be appreciated that other securing devices and methods for releasably securing multiple hoist system 202 to UAV 200 can be used. The use of securing hooks, generally, is one suitable method that can be used with the present technology. However, others are contemplated and are intended to be within the scope of this disclosure. Among many other examples of securing devices, the use of locks and pins, threaded systems, and latches may be used in lieu of or in addition to the securing methods illustrated and described herein.

Body 206 of multiple hoist system 202 houses first hoist 208 and second hoist 210. As illustrated, a portion of first hoist 208 and second hoist 210 extends outward from a bottom surface of body 206. Thus, in this example, body 206 houses only a portion of first hoist 208 and second hoist 210, while another portion of first hoist 208 and second hoist 210 is external to body 206. As will be described in more detail with other examples, the body generally comprises two or more hoists, but various suitable arrangements of the hoists within the body may be used. For example, hoists may be fully housed within the body.

Hoists, such as first hoist 208 and second hoist 210, are generally configured to lower a load using a line, such as first line 209 and second line 211, respectively. In addition to lowering a load, some hoists can also be configured to raise a load. A load comprises any weighted object, including the line itself. The load may comprise a parcel being delivered to a location by a carrier operating UAV 202.

In general, a number of hoists are suitable for use with the present technology. One consideration in selecting a hoist is the weight of the hoists versus the amount of load the hoists can raise or lower. When using larger UAVs that can carry parcels over long distances and have greater payload capacity, relatively heavier hoists may be selected for use. This provides the advantage of being able to raise and lower heavier parcels. Alternatively, where smaller UAVs are utilized for shorter delivery distances and that have lower payload capacities, relatively smaller hoists may be selected for use. This provides the advantage of weight reduction, allowing for more of the UAVs payload capacity to be dedicated to the parcel being delivered.

Some example hoists that can be used are commercial hoists, such as electric overhead hoists. These hoists are generally powered by an electric motor, which can receive a power supply from a power source associated with multiple hoist system 202 or with UAV 200. These commercial hoists are available in various weights and have various load capacities. In some embodiments, example hoists can include a multiple tether system linked to a single motor that is able to selectively actuate each of a plurality of tether reels for raising and lower the lines. For example, a winch with a single motor and a gearbox type mechanism can engage several tether reels lined up on a shared axle, lowering or reeling up each of the lines independently. The traction on each reel can be accomplished with an in-hub system, similar to those used on some bicycles, thus reducing the need to have more than one motor and resulting in a reduction in weight for the hoists. However, other hoists can be used without departing from the scope of the technology described herein.

Since weight is generally a consideration in the selection of hoists, another suitable device that can be used is an electric filament reel. Commercial monofilaments are available that can bear heavy loads, yet are lightweight. Among others, some examples include nylon, polyvinylidene fluoride (PVDF), polyethylene, polyethylene terephthalate (PET), and ultra-high-molecular-weight polyethylene (UHMWPE). Other biodegradable-type filaments can be selected for environmentally friendly and safe delivery. It should be understood, that unless expressly stated otherwise, the use of "hoist" and "electric reel" within this disclosure are synonymous. That is, where it is stated an electric reel may be used, it will be understood that a hoist could be used in addition to or alternatively, and vice versa.

Reels configured to utilize filament-type line are generally lighter in weight. Electric motors operable with such reels are available having different torque specifications. Similar to commercial hoists, the electric motors having greater torque typically have a relatively greater weight and size. The load that can be handled using an electric motor and reel combination (also referred to as an "electric reel") directly relates to the torque capacity of the motor. Thus, there can be a tradeoff between the torque specifications of an electric motor operating a reel. In this way, for UAVs designed to carry lighter loads, a relatively smaller and lighter weight electric motor and reel combination can be selected.

To provide some non-exclusive examples, an electric motor and reel combination can be selected having a torque capacity of up to 5 lbs, up to 10 lbs, up to 15 lbs, up to 20 lbs, and so forth. Any of these may be used in conjunction with, for example, a monofilament line having a rating of up to 5 lbs, up to 10 lbs, up to 15 lbs, up to 20 lbs, and so forth.

Reels may include line levelers, such as first line leveler 213 and second line leveler 214, illustrated in FIG. 2. Line levelers are optional and may be provided to level the line placement along the reel when retracting a line. Thus, when retracting lines from higher altitudes, line levelers can wind lines more evenly along a reel to keep the line from accumulating in one place and binding during the next extension of the line. Line levelers that are configured to move parallel to the reel as the reel is turned can be utilized. Using line levelers may provide the added benefit of lowering loads, including parcels for delivery, from higher altitudes, thus increasing safety of UAV delivery and allowing a UAV access to a greater number of locations, such as those where low altitude deliveries are difficult. While the use of line levelers is optional, a line leveler may be employed where UAVs deliver parcels using the line from an altitude of up to 25 ft, up to 50 ft, up to 75 ft, up to 100 ft, and so forth.

Figure 6:
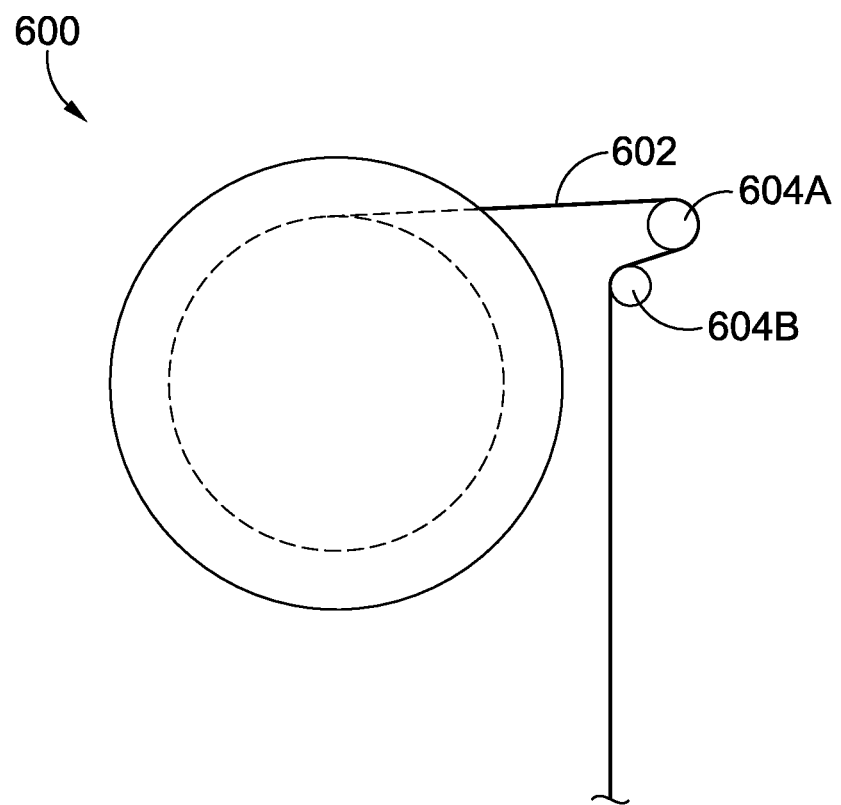
FIG. 6 is a side view of an example hoist having a line in use with curved contact points, in accordance with an aspect described herein.

Lines can be wrapped around the body or the UAV to reduce direct force applied to the motor of the reel. With brief reference to FIG. 6, the figure illustrates an example hoist 600 (e.g., an electric reel) employed for use with line 602. One or more curved contacts, such as curved contacts 604A and 604B, can be employed to modify the force applied to electric reel 600. In this way, the force applied along line 602 by an attached load can be distributed to other points of a multiple hoist system or a UAV. For example, a curved contact point can be secured to a body of the multiple hoist system. Curved contact points can be secured within the body or may be secured to an external surface of the body. In another example, curved contact points are secured to an external surface of the UAV. In this way, a line extends from an electric reel to the curved contact points and downward in order to lower and raise loads.

In some embodiments, simple tension sensors can be used to indicate when the parcel is released from the line. In some example embodiments, the arm where the curved contact 604B is held can be spring loaded and a pressure sensor can be attached thereto. Specifically, a spring-loaded small pulley that pushes against the line can result in tension in the line or lack thereof, such as if the parcel is resting on the ground or has been disconnected from the line. This lack of tension sensed by the tension sensors can indicate to the flight controller or any of the controllers described herein when the parcels attached to the line should be released (e.g., the parcel is resting on the ground) and when the corresponding hoist should raise the line back up (e.g., the parcel is detached therefrom).

With reference back to FIG. 2, some aspects of multiple hoist system 202 comprise a line cutter (not illustrated). Line cutters include any device for severing a line, such as first line 209 and second line 211. These may include systems having a sharp edge that is pressed against the line upon command from a flight controller or remote server. Other devices may apply heat or lasers to sever a line, and can also be controlled based on instructions received from the flight controller or remote server. Line cutters may be used to sever lines in the event of a line bind or snag.

An example method for severing a line using a line cutter includes extending the line from the UAV. When the line is at an extended position, detecting a line overload. The line overload occurs where the force applied to the line exceeds a safety threshold. The safety threshold can be based on the torque capacity of the electric reel or the line weight rating. The flight controller can detect that the safety threshold has been exceeded based on an amount of thrust necessary to maintain a target altitude. For example, the greater the downward force being applied to the line, the greater the upward force applied by the UAV motors must be to maintain the target altitude. If the force applied to the line increases, the flight controller will increase the upward thrust from the UAV motors to counteract the increased force. When the upward thrust exceeds the safety threshold, the flight controller activates the line cutter and severs the line. This allows the extended line to drop from the UAV and allows the UAV to continue navigation away from the area where it severed the line. This increases the safety of UAV delivery by allowing the UAV to continue safe navigation in the event a malfunction with the line occurs. For instance, should a line be lowered from a UAV and catch on an object, such as a tree, then line cutter can sever the line and allow the UAV to continue flight. Further, should a person accidently or maliciously pull an extended line during UAV parcel delivery, the UAV can sever the line and navigate away, as opposed to this causing a downed UAV.

Continuing with FIG. 2, first hoist 208 and second hoist 210 are independently operable. That is first hoist 208 can extend or retract line 209 independent of using second hoist 210. In this way, line 209 can be extended or retracted without regard to the position of line 211. Similarly, second hoist 210 is operable independent of first hoist 208, in that second hoist 210 can extend or retract line 211 without regard to the position of line 209. Where more than two hoists are provided in a multiple hoist system, each hoist can be independently operated.

As an example, hoists can generally be operable under guidance of the flight controller. The flight controller and the hoist can be in wired or wireless communication. In the example provided by FIG. 2, wired communication channel 212 is illustrated as providing a connection between components of UAV 200 and components of multiple hoist system 202, such as providing a communication channel between a flight controller of UAV 200, and first hoist 208 and second hoist 210. Thus, the flight controller can independently operate each hoist.

Figure 5:
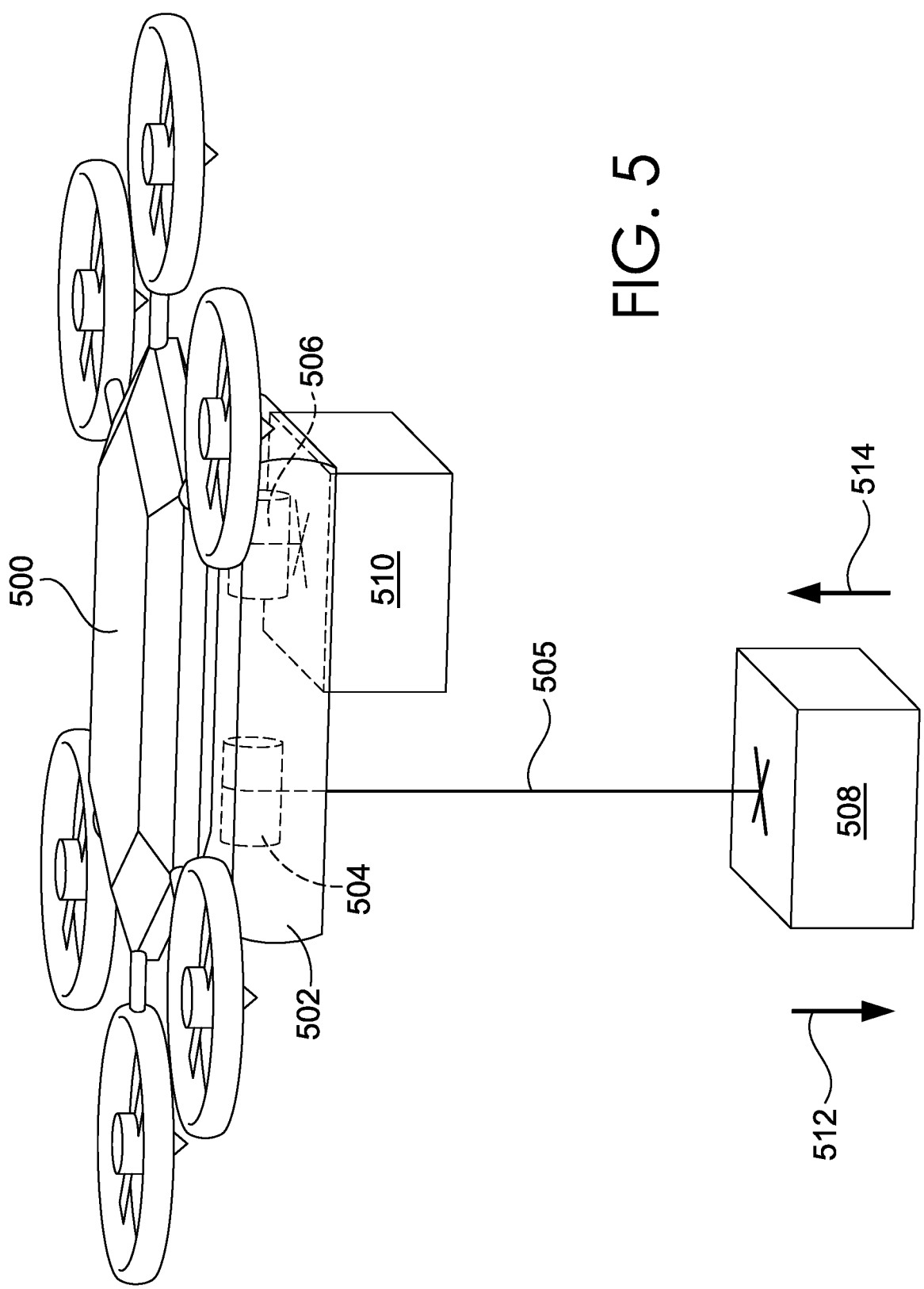
FIG. 5 is an illustration of a UAV engaging in independent operation of a first and second hoist of an example multiple hoist system, in accordance with an aspect described herein.

An illustration of independently operable hoists is provided by FIG. 5. In this example, UAV 500 is shown as a VTOL six-rotor multicopter. Secured to a bottom of UAV 500 is multiple hoist system 502, which comprises first hoist 504 and second hoist 506. First hoist 504 is configured to raise and lower line 505. Attached to first line 505 is first parcel 508. Second hoist 506 is configured to raise and lower second parcel 510 using a second line, which is not illustrated because of the raised position of parcel 510.

Because each of first hoist 504 and second hoist 506 are independently operable, parcels that are associated with each of the hoists can be independently lowered or raised. As illustrated in FIG. 5, parcel 508 can be lowered in the direction of first arrow 512 using first hoist 504. Similarly, parcel 508 can be raised in the direction of second arrow 514 using first hoist 504. In each of these events, whether first parcel 508 is being raised or lowered, second parcel 510 can remain in a constant position, shown in FIG. 5 as a raise position adjacent a lower surface of multiple hoist system 502. Similarly, independent of the movement of parcel 508, parcel 510 can be raised or lowered by hoist 506. In this way, UAVs can be configured to deliver multiple parcels to different delivery locations. That is, parcel 508 can be lowered to and released at a first delivery location, while second parcel 510 can be lowered to and released at a second delivery location. This allows for multiple deliveries in between loading or unloading of parcels onto the UAV.

Figure 7:
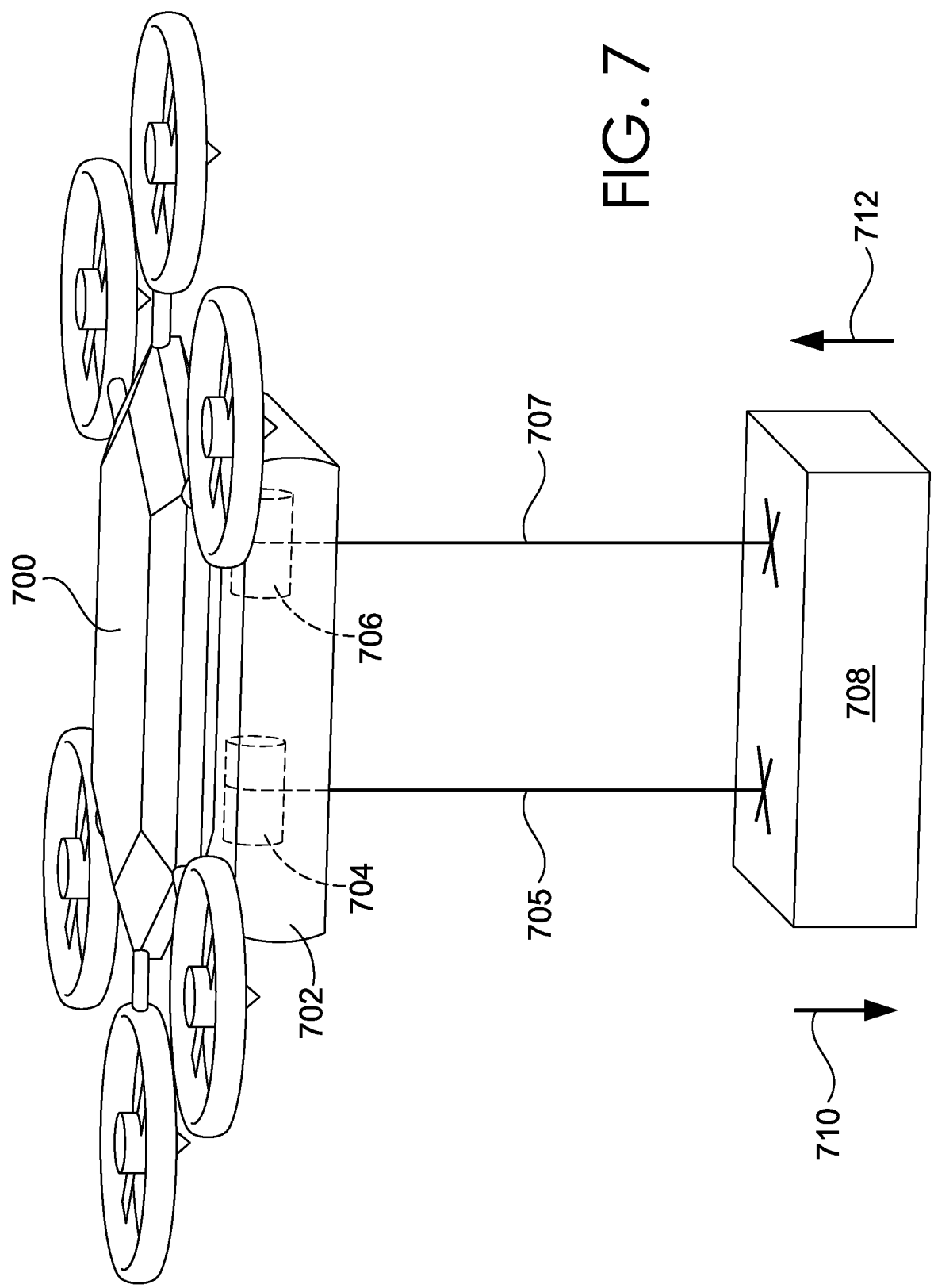
FIG. 7 is an illustration of a UAV engaging in synchronous operation of a first and second hoist of an example multiple hoist system, in accordance with an aspect described herein.

While hoists are generally independently operable, hoists can also be instructed to raise or lower lines synchronously. An example of this is illustrated in FIG. 7. FIG. 7 illustrates UAV 700, which is represented as a VTOL six-rotor multicopter. Multiple hoist system 702 is secured to UAV 700. Here, an upper surface of multiple hoist system 702 is secured to a lower surface of UAV 700, which as previously described, the multiple hoist system 702 could be releasably secured or permanently secured to UAV 700. Multiple hoist system 702 comprises first hoist 704 that operates to raise and lower first line 705 and second hoist 706 that operates to raise and lower second line 707.

Here, first hoist 704 and second hoist 706 are instructed to raise or lower first line 705 and second line 707, respectively, in a synchronous manner. That is, synchronously raising or lowering first line 705 and second line 707 comprises instructing first hoist 704 to raise or lower first line 705 at the same rate as second hoist 706 is instructed to raise or lower second line 707. In this manner, UAVs are more versatile, in that they can carry various size and shape parcels. As illustrated in FIG. 7, UAV 700 can lower parcel 708 in the direction of first arrow 710 or raise parcel 708 in the direction of second arrow 712 using two attachment points, where each attachment point to parcel 708 is associated with one of first line 705 or second line 707.

Figure 10:
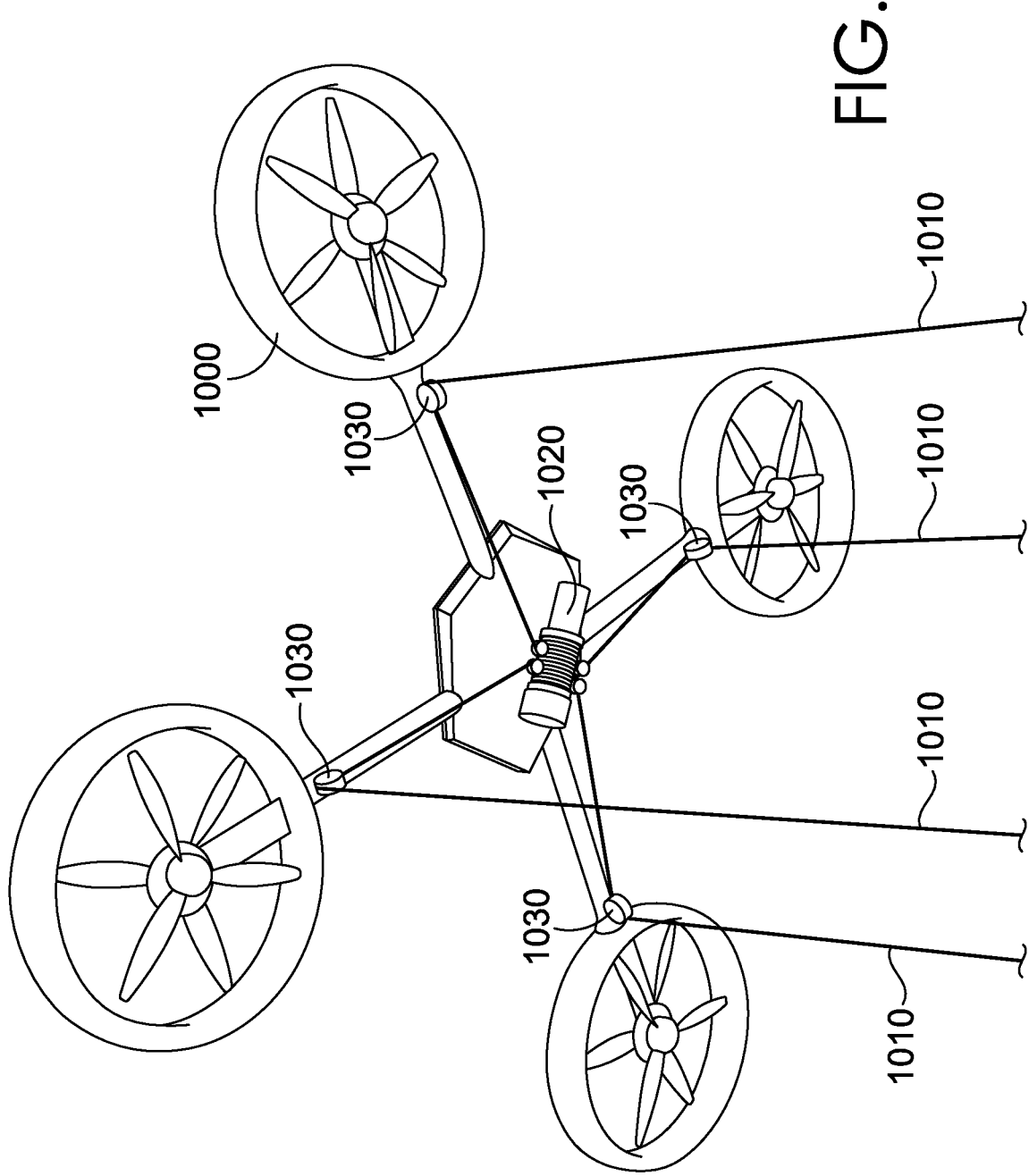
FIG. 10 is an illustration of a UAV with a single reel and multiple lines for synchronous raising and lowering of a parcel, in accordance with an aspect described herein.

In another alternative embodiment, one or more of the hoists can also be instructed to raise or lower lines synchronously using multiple lines in a single reel of a single hoist. Specifically, the single reel can use line levelers (as earlier described herein) and each line can be threaded through a different curved contact or small pulley to spread them apart. This configuration can be used for one or more of the hoists, such that each hoist is connected to multiple lines. In one example embodiment, as depicted in FIG. 10, a UAV 1000 can have four lines 1010 or tethers can be operated by a single reel 1020 and winch in this manner, with the four lines 1010 separated via a plurality of curved contacts 1030. This advantageously allows each line to be lighter, since the lines cooperatively share the load. This can also ensure that the load or parcel is lowered without spinning, which allows raising and securing the load or parcel in a correct position/orientation. In yet another embodiment, a single motor can similarly and synchronously operate a plurality of reels.

With reference back to FIG. 2, hoists, such as first hoist 208 and second hoist 210 can include a line release and a line counter. The line release and the line counter can be either electronic or mechanical. A line release is operable to release the line from electronic control of the hoist. In this way, a force applied to the line will allow the line to extend from the hoist. For example, a hoist may have a load attached to an associated line. By releasing the line from electronic control of the hoist, the line begins to extend away from the hoist due to the force applied to the line by the load. Thus, for example, a parcel may be lowered from an altitude by releasing the hoist based on the force of gravity applied to the line because of the attached parcel. As such, a UAV carrying a parcel can lower the parcel downward to a delivery location based on gravitational force, rather than expend power to electronically lower the parcel. A line counter generally works to apply an opposing force to the line. It may further reestablish electronic control by the hoist.

Using the line release and the line counter, a parcel may be lowered from an altitude above a delivery location by a UAV. The parcel can be initially be lowered by releasing the line using the line release and allowing gravity to lower the parcel. The line counter may engage at a predetermined rate of extension by the line. That is, to avoid continued constant acceleration and allowing the parcel to descend too rapidly, the line counter can be applied to reduce downward acceleration to up to zero. At a predetermined altitude of the parcel above the delivery location, the line counter can begin to slow the parcel down. The predetermined altitude can be any altitude, including as examples, 3 ft, 5 ft, 10 ft, 15 ft, and so forth. The line counter can further reestablish electronic control by the hoist. Using this method, once the parcel is lowered below the predetermined parcel altitude, the hoist can then engage in electronic control of the line's extension. The hoist can then electronically control the rate at which the parcel descends downward to the delivery location. By doing so, the parcel can be placed on the ground as its downward velocity is reduced to approach zero under electronic control of the hoist. As such, the parcel can gently be place onto a surface and released.

Figure 3:
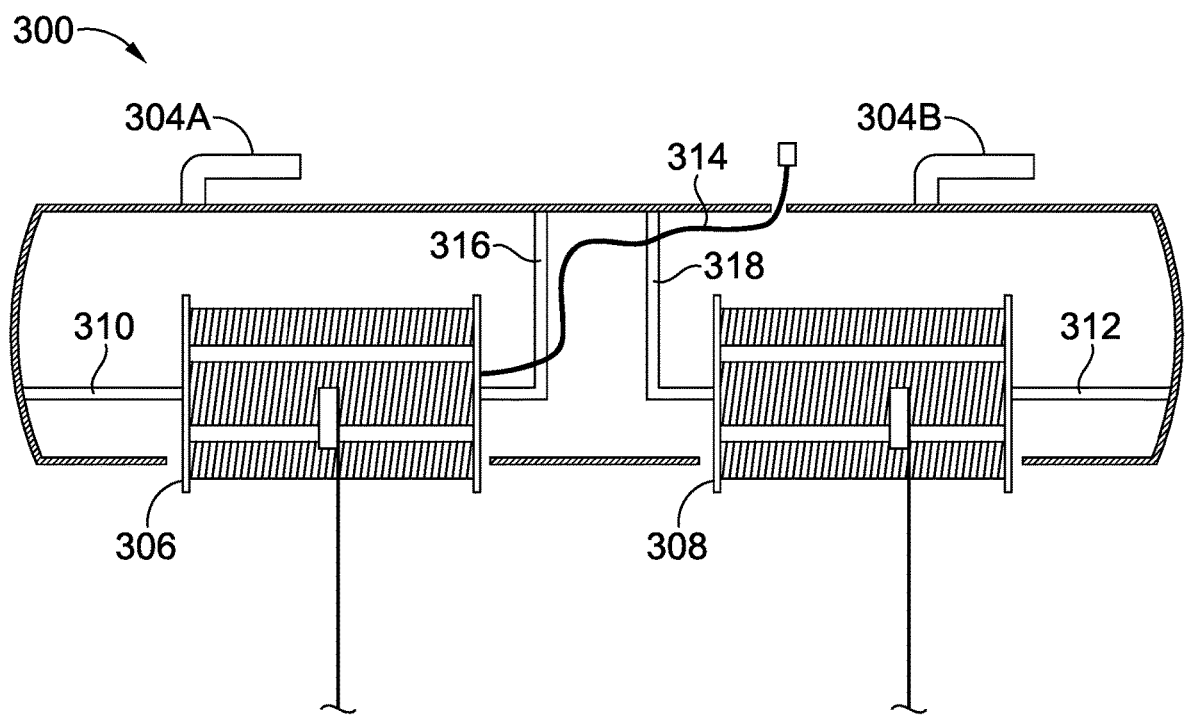
FIG. 3 is a side view of another example multiple hoist system having a side surface of a body removed for viewing within the body, in accordance with an aspect described herein.

Turning now to FIG. 3, a side view of example multiple hoist system 300 is provided. Multiple hoist system 300 comprises body 302. Here, a side surface of body 302 is removed to view within body 302. An upper surface of body 302 is illustrated as having securing hooks 304A and 304B, which can be used for releasably securing multiple hoist system 300 to a UAV, not illustrated in FIG. 3.

As provided by FIG. 3, multiple hoist system 300 comprises two hoists, first hoist 306 and second hoist 308. Each of the hoists is at least partially housed within body 302. As noted above, first hoist 306 and second hoist 308 may be embodied as electric reels. Motors for operating the electric reels are not illustrated, as motors may be included within first hoist 306 and second hoist 308, or may be external to the hoists. First hoist 306 and second hoist 308 can be secured or at least partially secured to body 302. As illustrated, communication channel 314 provides communication to first hoist 306 and second hoist 308 from a UAV (not illustrated). Communication channel 314 is intended to represent any number of communication channels, and in one example, is intended to represent a channel for providing power supplied from a UAV power source to a first motor associated with first hoist 306 and a second motor associated with a second hoist 308. Communication channel 314 may also provide a communication bus from each of first hoist 306 and second hoist 308, such that each of the hoists can receive instructions from a flight controller and operate in accordance with the instructions, such as to extend or retract a line, and the rate at which to do so.

One example method for operating first hoist 306 and second hoist 308 is to rotationally secure the hoists to body 302. An example method utilizes cylindrical shaft 310 and cylindrical shaft 312 to rotationally secure first hoist 306 and second hoist 308, respectively. Using this method, cylindrical shafts may be secured to the hoists. By rotating a cylindrical shaft, the hoist (again, which may include a reel of an electric reel) is rotated, allowing it to extend or release a corresponding line. Here, a motor may engage the cylindrical shaft, such that operation of the motor rotates the cylindrical shaft, thereby rotating the hoist.

Another method that may be used in addition to or in lieu of that just described, includes a stationary securing mechanism that secures the hoist to the body. As examples, brackets, threaded systems, rivets, among many other examples can be used to secure a hoist to a body of a multiple hoist system. FIG. 3, illustrates an example stationary arm 316 that secures first hoist 306 and another example stationary arm 218 that secures second hoist 308 to body 302. Using stationary securing devices, a motor may be provided as part of a hoist, such that the motor can rotate a portion of the hoists to raise and lower a line. Various methods of securing hoists to a body of a multiple hoist system will be recognized by those having ordinary skill in the art, and a suitable method can be selected based on the choice of hoist being utilized with the multiple hoist system.

Figure 4:
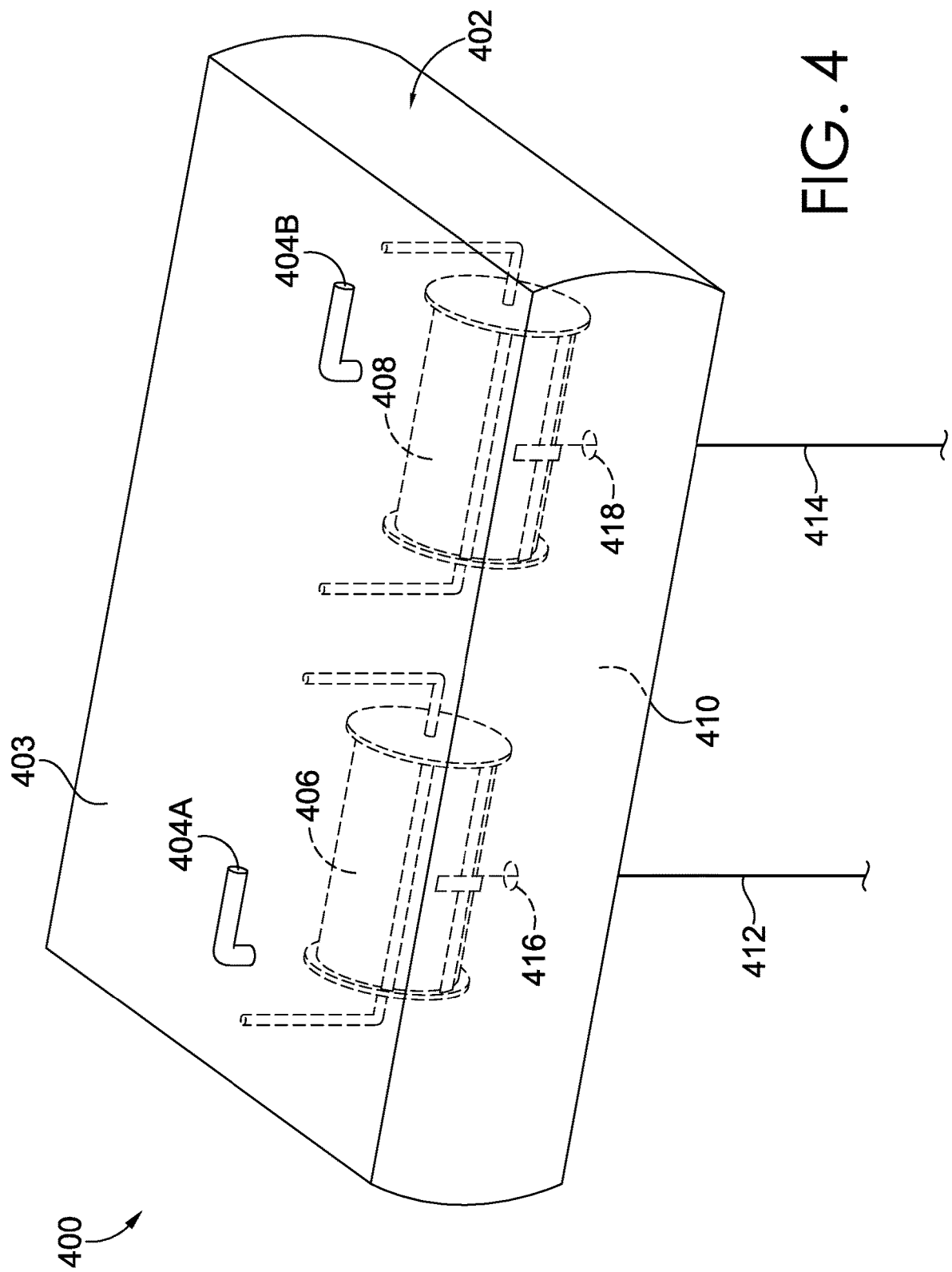
FIG. 4 is a side perspective view of another example multiple hoist system, in accordance with an aspect described herein.

Turning now to FIG. 4, a top and side perspective view of example multiple hoist system 400 is provided. Multiple hoist system 400 comprises body 402 having upper surface 403. One or more securing hooks, such as securing hooks 404A and 404B, are affixed to upper surface 403 and can be used to releasably secure multiple hoist system 400 to a UAV for parcel delivery. In another embodiment, multiple hoist system 400 may be permanently secured to the UAV. Body 402 fully houses first hoist 406 and second hoist 408. First hoist 406 is associated with first line 412, while second hoist 408 is associated with second line 414. First line 412 extends from inside body 402 to an outside of body 402 through first opening 416 on bottom surface 410 of body 402. Second line 414 is also illustrated as extending from the inside of body 402 to the outside of body 402 through second opening 418 on bottom surface 410 of body 402.

Figure 8:
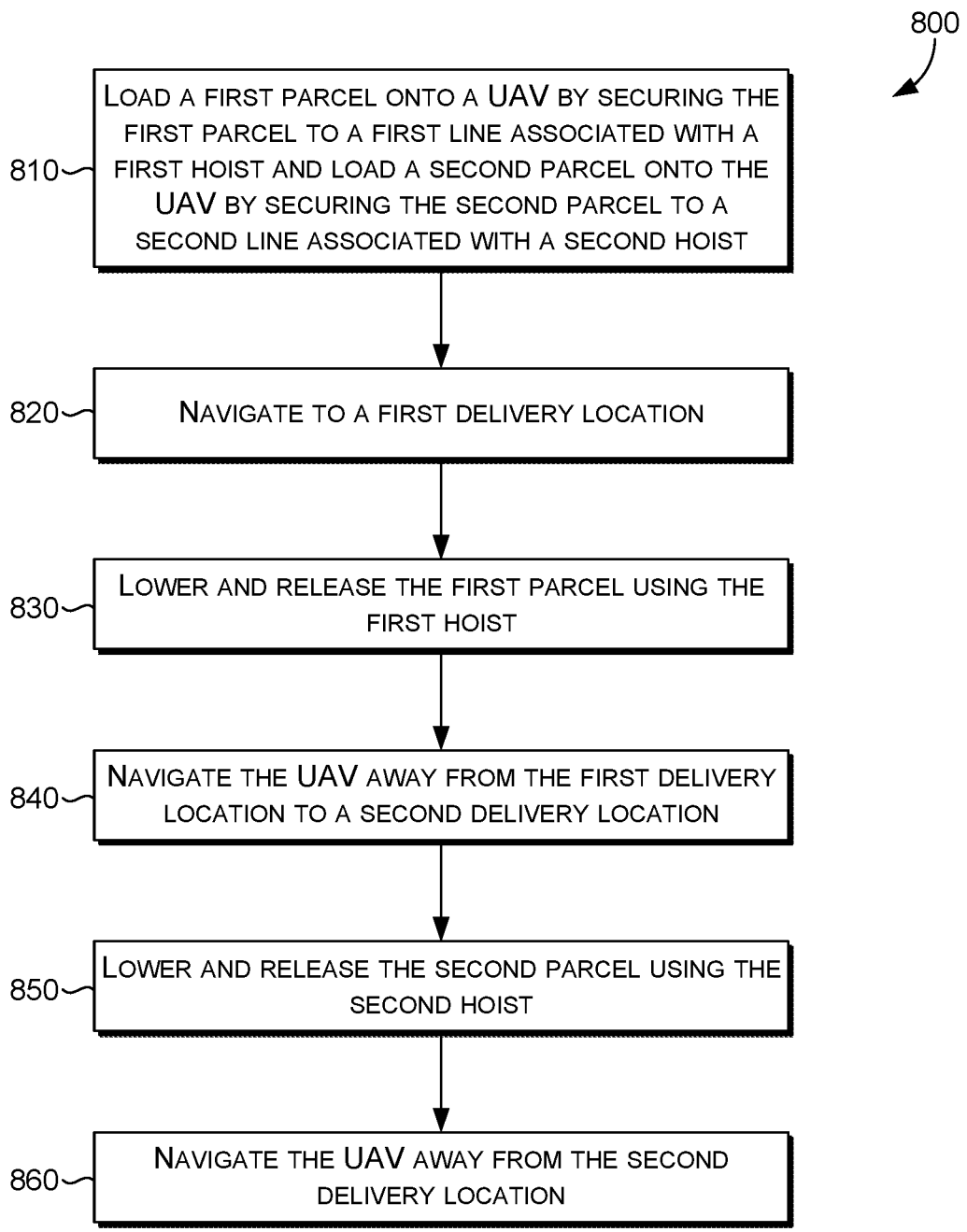
FIG. 8 is a block diagram illustrating an example method of delivering parcels using a multiple hoist system.

With reference now to FIG. 8, a block diagram for an example method 800 for delivering parcels using a multiple hoist system is provided. The method includes, at block 810, loading a first parcel onto a UAV by securing the first parcel to a first line associated with a first hoist of the UAV and loading a second parcel onto the UAV by securing the second parcel to a second line associated with a second hoist of the UAV, where each hoist is independently operable. This can be performed, in some embodiments, after releasably engaging the securing device of the body with the securing area of the UAV. However, as described above, the body can alternatively be fixed to or integral with the UAV without departing from the scope of the technology herein.

At block 820, the UAV is navigated to a first delivery location associated with the first parcel. From an altitude above the first delivery location, the method includes, at block 830, lowering the first parcel downward to the first delivery location using the first hoist and releasing the first parcel at the first delivery location. At block 840, the UAV is navigated away from the first delivery location to a second delivery location associated with the second parcel. At block 850, the second parcel is lowered downward to the second delivery location using the second hoist, and the second parcel is released at the second delivery location. At block 860, the UAV is navigated away from the second delivery location.

In addition to the steps described above, some embodiments of the method 800 can further comprise the flight controller receiving indication that the first parcel or the second parcel has reached the first delivery location or the second delivery location. As a result of this indication, the flight controller can further instruct release of the first parcel or the second parcel from the first line or the second line. For example, a claw mechanism (not shown) may be communicably coupled to the flight controller and actuatable to close or open upon commands therefrom. However, other mechanisms such as hooks or the like can attach to and detach from the first and second parcels without departing from the scope of the technology described herein. Upon release of the first parcel or the second parcel, the flight controller can further instruct the first hoist or the second hoist to retract the corresponding first line or second line via the motor or any other actuators used by the first or second hoists.

Figure 9:
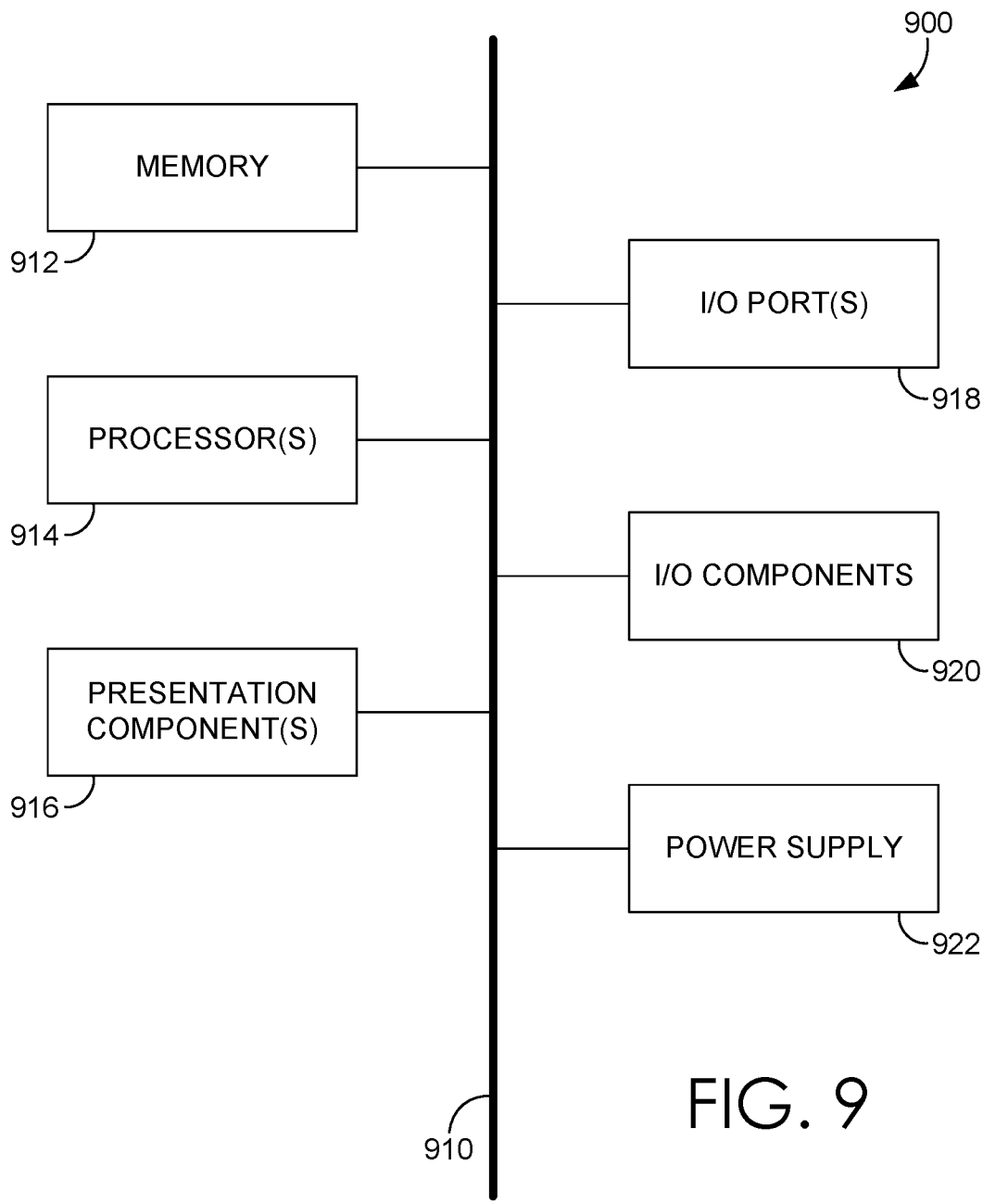
FIG. 9 is a block diagram of an example computing device suitable for use with aspects of the present technology.

With reference to FIG. 9, an example computing device 900 is provided. Computing device 900 includes bus 910 that directly or indirectly couples the following devices: memory 912, one or more processors 914, one or more presentation components 916, input/output ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 9 is merely illustrates an example computing device that can be used in connection with one or more embodiments of the present technology. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile or nonvolatile memory. The memory may be removable, non-removable, or a combination thereof. Example hardware devices include solid-state memory, hard drives, optical-disc drives, etc. Computing device 900 includes one or more processors that read data from various entities such as memory 912 or I/O components 920. Presentation component(s) 916 present data indications to a user or other device. Examples of presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

As used in this disclosure, the word "delivery" is intended to mean both "to drop off" and "to pickup," unless one of the options is impracticable. For example, a "delivery vehicle" is a vehicle capable of picking up a parcel and dropping off a parcel at a location. Words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. A system comprising:
an unmanned aerial vehicle (UAV) having a securing area; and
a multiple hoist system comprising:
a body releasably coupled to the UAV at the securing area, and
at least two hoists attached to the body, each of the at least two hoists being operable to independently extend a first line from a first hoist and a second line from a second hoist.

2. The system of claim 1, wherein the body further comprises a securing device, and the body is releasably coupled to the UAV via the securing device of the body.

3. The system of claim 1, wherein the first hoist comprises a first reel operable for selectively extending and retracting the first line, wherein the second hoist comprises a second reel operable for selectively extending and retracting the second line.

4. The system of claim 3, wherein at least one of the at least two hoists comprises at least one line leveler movable parallel to the first reel or the second reel as the first reel or the second reel rotates for evenly winding the first line or the second line during retraction thereof.

5. The system of claim 3, further comprising one or more curved contact points integral with or fixed relative to the body, wherein the first line or the second line contacts the one or more curved contact points creating tension in the first line or the second line between the one or more curved contact points and the first reel or the second reel.

6. The system of claim 1, further comprising a controller and line cutters operable to sever at least one of the first line or the second line in response to instructions from the controller.

7. The system of claim 6, wherein the controller is operable to send the instructions to the line cutters when at least one of an upward thrust of the UAV or a force applied to the first line or the second line exceeds a safety threshold.

8. The system of claim 1, wherein each of the at least two hoists are selectively operable to synchronously extend the first line from the first hoist and the second line from the second hoist.

9. The system of claim 1, wherein the multiple hoist system comprises a plurality of curved contact points, the first hoist comprises a first reel operable for extending and retracting the first line, and the first line engages the plurality of curved contact points.

10. The system of claim 1, further comprising a UAV flight controller and a communication channel, wherein the communication channel provides control signals to the at least two hoists from the UAV flight controller.

11. The system of claim 1, wherein each of the at least two hoists comprises a motor and a cylindrical shaft rotatable via the motor to extend or release the first line or the second line.

12. The system of claim 11, wherein one or more of the at least two hoists further comprise a line release configured to selectively prevent or oppose a gravity force from further releasing the first line or the second line based on altitude.

13. A method for delivering parcels with an unmanned aerial vehicle (UAV) via a multiple hoist system, the method comprising:
loading a first parcel onto a first line associated with a first hoist of the multiple hoist system;
loading a second parcel onto a second line associated with a second hoist of the multiple hoist system, wherein the first hoist and the second hoist are operable independently of each other;
navigating the UAV, via a flight controller of the UAV, to a first delivery location associated with the first parcel;
lowering, via the first hoist and the first line, the first parcel downward to the first delivery location from an altitude above the first delivery location;
navigating the UAV, via the flight controller, away from the first delivery location to a second delivery location associated with the second parcel;
lowering, via the second hoist and the second line, the second parcel downward to the second delivery location from an altitude above the second delivery location; and
navigating the UAV, via the flight controller, away from the second delivery location.

14. The method of claim 13, further comprising a step of receiving with the flight controller a first indication that the first parcel or the second parcel has reached the first delivery location or the second delivery location and instructing release of the first parcel or the second parcel from the first line or the second line.

15. The method of claim 14, further comprising instructing, via the flight controller, the first hoist or the second hoist to retract the first line or the second line upon a second indication that the first parcel or the second parcel is released from the first line or the second line.

16. The method of claim 14, wherein the first indication that the first parcel or the second parcel has reached the first delivery location or the second delivery location is provided by a tension sensor operable to sense a lack of tension in the first line or the second line.

17. The method of claim 13, further comprising releasably attaching a body supporting the first and second hoists to the UAV via a securing device of the body releasably engaging the securing area of the UAV.

18. The method of claim 13, further comprising sending, via the flight controller, instructions to line cutters of the multiple hoist system to sever at least one of the first line and the second line in response to indications that at least one of an upward thrust of the UAV or a force applied to the first line or the second line exceeds a safety threshold.

19. The method of claim 13, further comprising selectively disengaging, via instructions from the flight controller, a rotatable shaft or reel from a motor of the first hoist or the second hoist such that a gravity force lowers the first parcel downward to the first delivery location or the second parcel downward to the second delivery location.

20. A system of for delivery of multiple parcels to multiple locations, the system comprising:
an unmanned aerial vehicle (UAV) having a securing area and a flight controller; and
a multiple hoist system comprising:
a body releasably coupled to the UAV at the securing area, and
at least two hoists attached to the body, each of the at least two hoists being operable to independently extend a first line from a first hoist and a second line from a second hoist,
wherein the flight controller has one or more processors configured to:
navigate the UAV to a first delivery location;
command the first hoist to lower the first line downward to the first delivery location from an altitude above the first delivery location;
navigate the UAV away from the first delivery location to a second delivery location;
command the second hoist to lower the second line downward to the second delivery location from an altitude above the second delivery location; and
navigate the UAV away from the second delivery location.

* * * * *

UNITED STATES PATENT AND TRADEMARK OFFICE
CERTIFICATE OF CORRECTION

PATENT NO. : 11,807,367 B2
APPLICATION NO. : 17/108613
DATED : November 7, 2023
INVENTOR(S) : John Pass It is certified that error appears in the above-identified patent and that said Letters Patent is hereby corrected as shown below:

In the Claims

Column 14, Line 27, Claim 20, the line reading "A system of for delivery of multiple parcels to" should read -- A system for delivery of multiple parcels to --.

Signed and Sealed this
Twelfth Day of March, 2024

*Katherine Kelly Vidal*

Katherine Kelly Vidal
*Director of the United States Patent and Trademark Office*